United States Patent [19]
Chen

[11] Patent Number: 5,449,189
[45] Date of Patent: Sep. 12, 1995

[54] DELAYED-RETURN SUSPENSION FORK FOR A BICYCLE

[76] Inventor: Tsai-Lie Chen, No. 2, Lane 371, Hwacheng Rd., Hsin Chuang City, Taipei Hsien, Taiwan

[21] Appl. No.: 298,336

[22] Filed: Aug. 30, 1994

[51] Int. Cl.⁶ .................... B62K 21/08; B62K 25/08
[52] U.S. Cl. .................. 280/276; 267/141.1; 280/279
[58] Field of Search ............... 280/276, 277, 278, 279; 267/141.1, 141.2, 217, 219, 64.26, 64.28, 34

[56] References Cited

U.S. PATENT DOCUMENTS

| | | | |
|---|---|---|---|
| 5,088,705 | 2/1992 | Tsai | 280/276 |
| 5,284,352 | 2/1994 | Chen | 280/277 |
| 5,310,203 | 5/1994 | Chen | 267/141.1 |
| 5,367,918 | 11/1994 | Chang et al. | 280/279 |

*Primary Examiner*—Mitchell J. Hill
*Attorney, Agent, or Firm*—Bacon & Thomas

[57] ABSTRACT

A bicycle with a delayed-return suspension fork with two shock-absorbing units. Each shock-absorbing unit has an upper tube assembly telescopically received in a lower tube assembly with an inner tube assembly slidably retained within the lower tube assembly. An elongate cylinder extends upwardly from a base of the lower tube assembly. An elongate piston extends downwardly from a top of the upper tube assembly and is slidingly received in a distal end of the elongate cylinder. A series of resilient tubular cushions are mounted about the elongate piston. The inner tube assembly defines a chamber in order to contain a fluid. A conduit, a washer, a spring and a positioning seat are contained. When the upper tube assembly travels into the lower tube assembly, fluid is urged through the conduit, the fluid further urges the washer, spring and positioning seat away from the conduit permitting rapid passage of the fluid. However, as the load is removed from the bicycle, the spring urges the washer back to the conduit partially blocking the passage of the fluid resulting in a return stroke slower than the compression stroke.

1 Claim, 3 Drawing Sheets

DELAYED-RETURN SUSPENSION FORK FOR A BICYCLE

BACKGROUND OF INVENTION

This invention relates to a delayed-return suspension fork for a bicycle.

The riding of mountain bicycles has become increasingly popular in recent years and this has led to a demand for suspension forks to be fitted to the bicycles so the riders can cope with very uneven terrain. However, it is found that many commercially-available suspension forks have a too-rapid return motion which results in an effect like riding a child's pogo stick. This leads to discomfort and reduced control of the bicycle. Thus there has been a long and unfulfilled need for a bicycle suspension fork with a return motion slower than its compression motion.

SUMMARY OF THE INVENTION

This invention provides a bicycle with a delayed-return suspension fork comprising two shock-absorbing units each comprising an upper tube assembly telescopically received in a lower tube assembly with an inner tube assembly slidably retained within the lower tube assembly. An elongate cylinder extends upwardly from a base of the lower tube assembly. An elongate piston extends downwardly from a top of the upper tube assembly and is slidingly received in a distal end of the elongate cylinder. A series of resilient tubular cushions are mounted about the elongate piston. The inner tube assembly defines a chamber containing a fluid and further contains a conduit, a washer, an arcuate spring and a positioning seat. When the upper tube assembly travels into the lower tube assembly, fluid is urged through the conduit, the fluid further urges the washer, arcuate spring and positioning seat away from the conduit permitting rapid passage of the fluid. However, as the load is removed from the bicycle, the arcuate spring urges the washer back to the conduit partially blocking the passage of the fluid resulting in a return stroke slower than the compression stroke.

DETAILED DESCRIPTION OF THE PREFERRED EMBODIMENT

Figure 1:
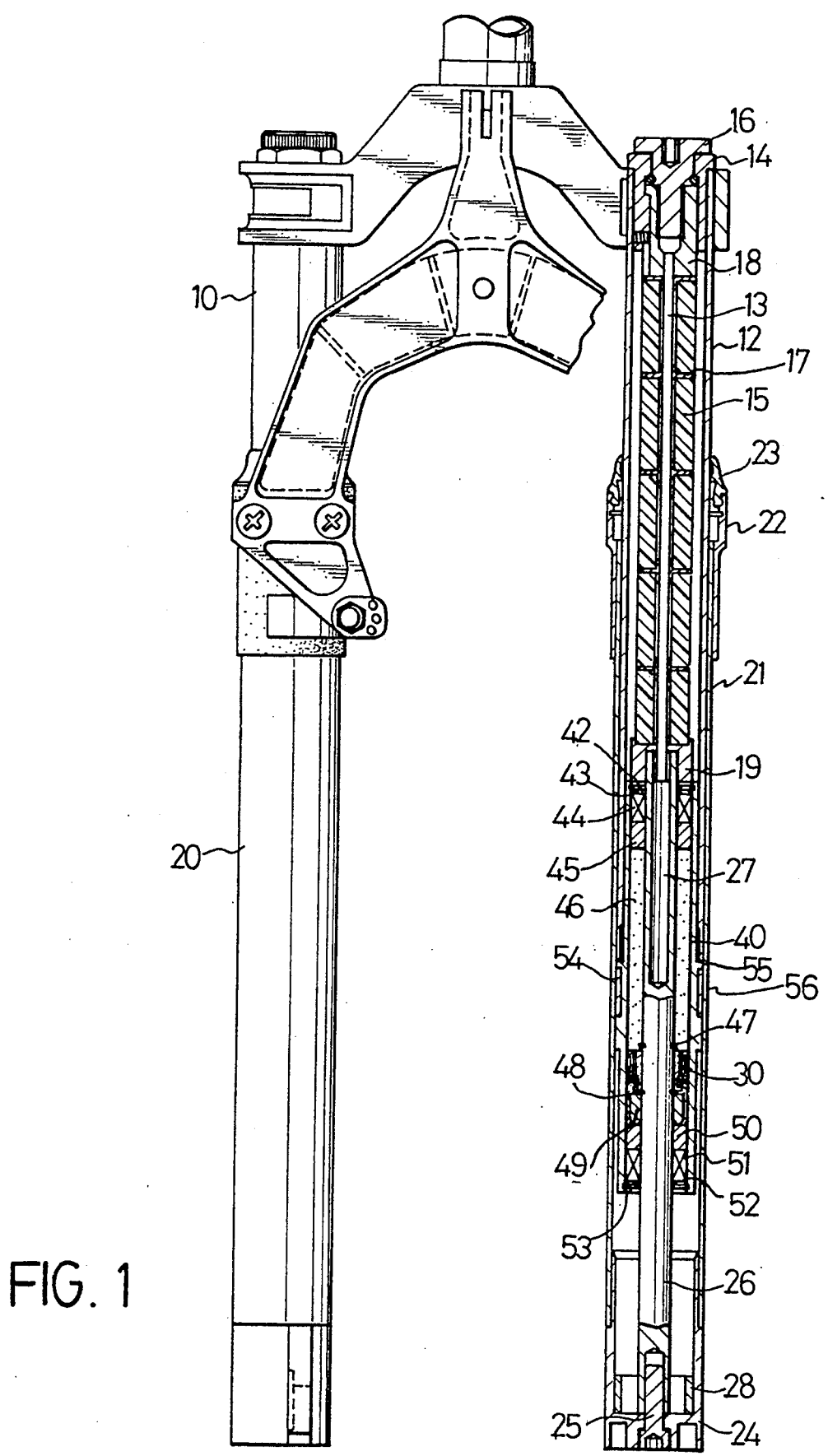
FIG. 1 is a partly cross-sectional view of a bicycle fork in accordance with the present invention.

Referring to FIG. 1, a delayed-return suspension unit comprises an upper tube assembly 10, telescopically received in a lower tube assembly 20 and an inner tube assembly 40 slidably disposed within the lower tube assembly 20 and being in moveable contact with the upper tube assembly 10.

The upper tube assembly 10 comprising a sleeve 12, a plug 14 fitting in a first end of the sleeve 12, an adjusting nut 16 disposed in a first end of the plug 14, a tubular bearing 18 disposed in a second end of the plug 14 and in contact with the adjusting nut 16, and elongate piston 13 extending through and beyond the tubular bearing 18, a plurality of tubular resilient cushions 15 mounted about the elongate piston 13, a corresponding plurality of washers 17 each separating 2 resilient cushions 15 and a tubular seat 19 mounted about the elongate piston 13 abutting a final resilient tubular cushion 15.

The lower tube assembly 20 comprising a sleeve 21, a collar 22 surrounding an upper periphery of the sleeve 21, a flexible tubular shield 23 mounted substantially on a top surface of the collar 22 a tubular plug 24 disposed in a bottom end of the sleeve 21, a bolt 25 extending through and beyond the tubular plug 24, an elongate cylinder 26, a first end of which has a recess 27 and a second end of which has a threaded hole [not numbered] for accepting the bolt 25 and a resilient tubular cushion 28 mounted around the second end of the elongate cylinder 26.

The inner tube assembly 40 includes a tube 41, a first retaining clip 42, a first washer 43, a first tubular bearing 44, a first tubular gasket 45, a fluid 46 such as hydraulic oil, a third retaining clip 47, a conduit 30 (see FIG. 2), a second washer 36 (see FIG. 2), an arcuate spring 37 (see FIG. 2), a positioning seat 39 (see FIG. 2), a fourth retaining clip 48, a resilient tubular cushion 49, a second gasket 50, a second bearing 51, a third washer 52 and a fifth retaining clip 53 all sequentially disposed therein and a friction collar 54 mounted on an outer periphery thereof which is retained in position by upper and lower ridges 55, 56.

Figure 2:
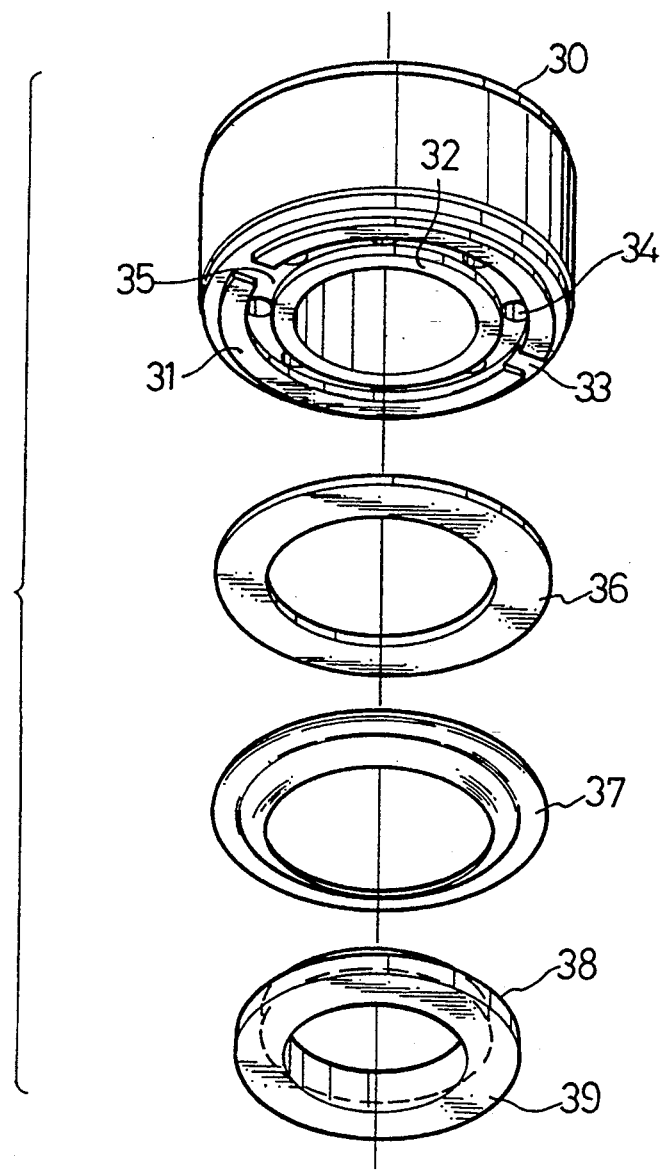
FIG. 2 is an exploded view of a conduit assembly.
Figure 3:
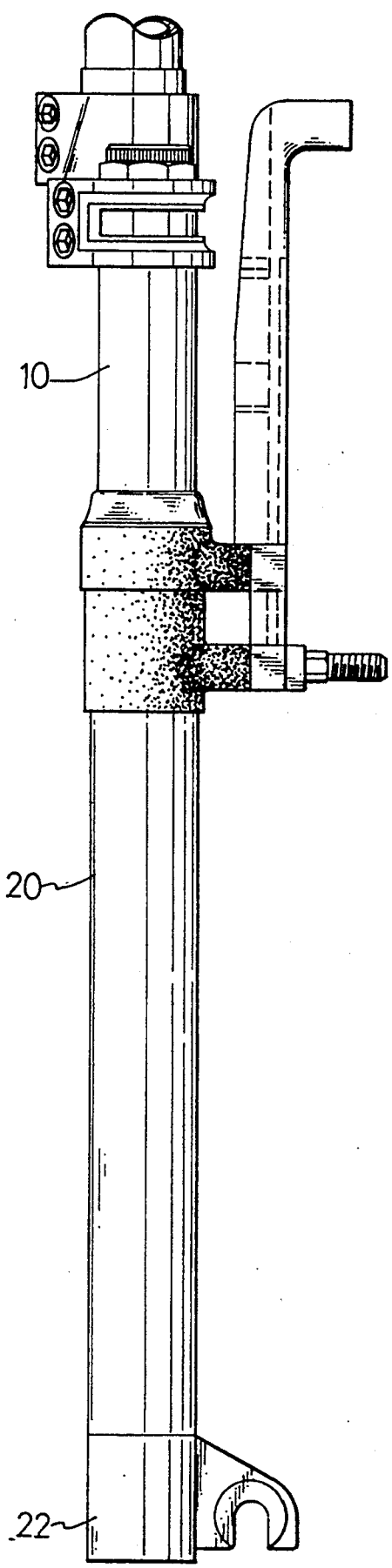
FIG. 3 is a side view of a bicycle fork in accordance with the present invention.

Referring to FIG. 2, the conduit 30 has an upper face, a lower face and a central bore. Two arcuate ridges 31 project from the lower face of the conduit, defining two channels 33. A circular ridge 32 also projects form the lower face adjacent to the central bore. A plurality of through holes 34 extend through the conduit exiting in a passageway 35 defined by the arcuate ridges 31 and the circular ridge 32. The arcuate spring 37 has an outer diameter equal to the diameter of the washer 36. The positioning seat 39 has an arcuate ridge 38 extending from a top surface thereof.

The washer 36 has an outer diameter equal to a diameter across the two arcuate ridges 31.

In operation, as a result of a load upon the bicycle, the upper tube assembly 10 travels into the lower tube assembly 20, the resilient tubular cushions 15 of the upper tube assembly 10 transmit pressure onto the seat 19 which in turn transmits pressure to the first retaining clip 42, the first washer 43, the first bearing 44, and the first gasket 45 which results in pressure on the fluid 46. The increase in pressure on the fluid 46 urges said fluid through the holes 34 in the conduit 30, which in turn urges the washer 36, arcuate spring 37 and positioning seat 39 away from the lower face of the conduit 30 permitting fluid 46 to pass rapidly through the conduit 30.

When the load is removed from the bicycle, the spring 37 urges the washer 36 back to the lower face of the conduit before the fluid 46 has returned through the conduit 30. As access to the passageway 35 is now restricted to the channels 33 the flow of fluid is more restricted than the previous flow through the holes 34 and the passageway 35.

What is claimed is:

1. A delayed-return shock-absorbing unit comprising:
   a lower tube assembly, an upper tube assembly telescopically received in said lower tube assembly, an inner tube assembly which is slidably retained in the lower tube assembly and defines a chamber for containing a fluid, an elongate cylinder extending upwardly from a base of the lower tube assembly, an elongate piston which extends downwardly from a top of the upper tube assembly and is slidably received in a distal end of the elongate cylinder, a series of resilient tubular cushions mounted on the elongate piston, a conduit comprising at least one arcuate ridge and a circular ridge each projecting from a bottom face thereof, a passageway being defined between the arcuate ridge and circular ridge, at least one throughhole in communication with said passageway, and a central bore, a washer, a spring and a positioning seat; wherein said conduit, said washer, said spring and said positioning seat are sequentially mounted on said elongate cylinder in descending order so that when the upper tube assembly travels into the lower tube assembly, fluid is urged through the conduit so as to urge the washer, spring and positioning seat away from the conduit so as to permit rapid travel of the fluid through the conduit, as the load is removed from the bicycle, the spring biases the washer back to the conduit so as to partially block the travel of the fluid, thus resulting in a return stroke slower than the compression stroke.

* * * * *